United States Patent
Nakamura et al.

(10) Patent No.: US 7,782,423 B2
(45) Date of Patent: Aug. 24, 2010

(54) LIQUID CRYSTAL DISPLAY WITH FIRST AND SECOND TRANSPARENT RESIN LAYERS HAVING AT LEAST ONE DIFFERENT CHARACTERISTIC

(75) Inventors: Kiyomi Nakamura, Hitachi (JP); Hiroshi Sasaki, Mito (JP); Makiko Sugibayashi, Hitachi (JP); Yasushi Tomioka, Hitachinaka (JP); Katsumi Kondo, Mito (JP)

(73) Assignee: Hitachi Displays, Ltd., Chiba (JP)

( * ) Notice: Subject to any disclaimer, the term of this patent is extended or adjusted under 35 U.S.C. 154(b) by 274 days.

(21) Appl. No.: 12/018,504

(22) Filed: Jan. 23, 2008

(65) Prior Publication Data

US 2008/0192181 A1    Aug. 14, 2008

(30) Foreign Application Priority Data

Feb. 13, 2007    (JP) .............................. 2007-031902

(51) Int. Cl.
*G02F 1/1333* (2006.01)
*G02F 1/1335* (2006.01)

(52) U.S. Cl. ..................... 349/84; 349/122; 349/161; 349/96

(58) Field of Classification Search ............ 349/84, 349/161, 96, 122
See application file for complete search history.

(56) References Cited

U.S. PATENT DOCUMENTS

| 5,808,715 A * | 9/1998 | Tsai et al. ................... 349/122 |
| 6,504,587 B1 * | 1/2003 | Morishita et al. ............. 349/58 |
| 2005/0243242 A1 * | 11/2005 | Moon et al. ................... 349/60 |
| 2007/0002211 A1 | 1/2007 | Sasaki et al. |
| 2007/0046874 A1 | 3/2007 | Adachi et al. |

FOREIGN PATENT DOCUMENTS

| JP | 8-11052 | 4/1996 |
| JP | 08110521 A * | 4/1996 |
| JP | 2003-84270 | 3/2003 |
| JP | 2004-181975 | 7/2004 |
| JP | 2005-134841 | 5/2005 |

\* cited by examiner

*Primary Examiner*—Mike Qi
(74) *Attorney, Agent, or Firm*—Antonelli, Terry, Stout & Kraus, LLP.

(57) ABSTRACT

In a liquid crystal display comprising a liquid crystal layer, a pair of substrates between which the liquid crystal layer is arranged, a pair of polarizing plates arranged between which the substrates are arranged, and a light source arranged at an outside of the polarizing plates, the liquid crystal display further comprises a first transparent resin layer arranged between the liquid crystal layer and the light source and a second transparent resin layer to be arranged between the viewer and the liquid crystal layer, and a linear thermal expansion coefficient of the first transparent resin layer is smaller than that of the second transparent resin layer.

12 Claims, 2 Drawing Sheets

LIQUID CRYSTAL DISPLAY WITH FIRST AND SECOND TRANSPARENT RESIN LAYERS HAVING AT LEAST ONE DIFFERENT CHARACTERISTIC

BACKGROUND OF THE INVENTION

The present invention relates to a liquid crystal display having an improved impact resistance and being restrained from being curved or deformed.

In recent years, a display for information-communication equipment is improved significantly. Particularly, a liquid crystal display can be decreased in its thickness and weight in comparison with a braun tube and improved in technique for increasing view angle and moving image, so that the liquid crystal display is necessary for mobile equipment or consumer digital electronics. It is desired for the liquid crystal display to have a size increased in accordance with a market requirement.

A substrate of the liquid crystal display is generally a glass plate having a thickness not more than 1 mm. An impact resistance of the glass plate decreases in accordance with an increase in area of its surface. Therefore, in the prior art, the impact resistance decreases significantly in accordance with increase of the size thereof. Incidentally, there is a provability of that the impact insufficient for destroying the glass plate as a pressure from an outside of the display generates a local shift or gap between the glass plates between which a liquid crystal layer is arranged, to cause a deterioration of displayed image.

Further, a thermal energy generated by a light source increases in accordance with an increase in quality and brightness of the image. When the light source is excited, a temperature of a side of the panel facing to the light source is increased to increase a difference in temperature between the side of the panel facing to the light source and another side thereof facing to a viewer. Therefore, the panel is curved or deformed. Particularly, the panel including a plate for generating a difference in phase is curved significantly. Such deformation of the panel causes an irregularity in the image.

Further, an increase of a time period during which the light source is continuously excited causes a deformation (expansion or contraction) of a polarizing plate so that the glass plate adjacent to the polarizing plate is deformed or curved to deteriorate the quality of the displayed image. Further, a stress concentration is generated at a boundary between the polarizing plate and the glass plate by the deformation of the polarizing plate to cause a removal or clearance at the boundary.

JP-A-2004-181975 and JP-A-2005-134841 disclose a shock absorbing layer arranged on the another side of the glass substrate facing to the viewer to improve the impact resistance. JP-A-2003-84270 discloses an adhesive as the shock absorbing layer between the substrate and the polarizing plate. By such arrangements, the shift between the polarizing plate and the substrate and the disturbance in orientation of the liquid crystal is restrained from being generated by the stress applied from the outside. JP-A-8-110521 discloses a liquid crystal panel including a liquid crystal cell, the polarizing plates between which the liquid crystal cell is arranged, and resin plates adhered to respective outer sides of the polarizing plates and having a contraction rate smaller than that of the polarizing plates and an elastic modulus higher than that of the polarizing plates. By this arrangement, the polarizing plates are restrained by a rigidity of the resin plates from being contracted when receiving a high temperature.

BRIEF SUMMARY OF THE INVENTION

The display panel protect layer as disclosed by JP-A-2004-181975 and JP-A-2005-134841 is effective against the impact from the outside, scratch or the like. However, in these, the polarizing plate, particularly the polarizing plate facing to the light source to be heated higher than the polarizing plate facing to the viewer, cannot be restrained from being deformed by the temperature increase of the panel when TV is used, so that the panel is deformed or curved.

JP-A-2003-84270 is effective for a relatively small stress generating the shift between the substrate and the plate, but seems to be not effective for a great outer force sufficient for destroying the liquid crystal substrate. A characteristic of the shock absorbing layer other than a material thereof is not disclosed, but as reading out from the drawings thereof, a thickness of the shock absorbing layer is significantly smaller than a thickness of the polarizing plate so that the impact resistance against the great outer force sufficient for destroying the liquid crystal substrate, such as a free drop of the substrate or a collision on the substrate is insufficient. Further, the polarizing plate is restrained by the rigidity of the resin plates from being contracted when the panel receives the high temperature, but since the liquid crystal cell is arranged between the same resin plates, an expansion in volume of one of the resin plates facing to the light source is greater than that of the other one of the resin plates facing to the viewer so that the panel is curved or deformed.

In JP-A-8-110521, since the same resin plates are arranged respectively on the sides of the liquid crystal cell facing to the light source and facing to the light source similarly to JP-A-2003-84270, the expansion in volume of the one of the resin plates facing to the light source to be heated higher than the other one of the resin plates facing to the viewer is greater than that of the other one of the resin plates facing to the viewer so that the panel is curved or deformed.

An object of the present invention is to provide a liquid crystal display which has an impact resistance irrespective of an increase in size of the display, a displacement between plates caused by a relatively small outer force is restrained, and a curvature or deformation of panel is restrained when the panel is heated by exciting the display.

According to the invention, a crystal liquid display comprising a pair of substrates, a liquid crystal layer between the substrates, a pair of polarizing plates between which the substrates are arranged, and a light source facing to the one of the polarizing plates, is characterized in that the crystal liquid display further comprises a pair of transparent resin layers between which the substrates are arranged, a linear expansion coefficient of one of the transparent resin layers between the light source and the substrates is smaller than that of the other one of the transparent resin layers.

According to the invention, a crystal liquid display having a sufficient impact resistance can be provided irrespective of an increase in size of a glass substrate. Further, a crystal liquid display in which a displacement between the substrates is restrained from being generated by an outer force, and a panel is restrained from being curved or deformed when the panel is heated to a high temperature by exciting the display for a long time period so that a disturbance of a displayed image is restrained, is provided.

Other objects, features and advantages of the invention will become apparent from the following description of the embodiments of the invention taken in conjunction with the accompanying drawings.

DETAILED DESCRIPTION OF THE INVENTION

Hereafter, embodiments of the invention will be described with making reference to the drawings.

Figure 1A:
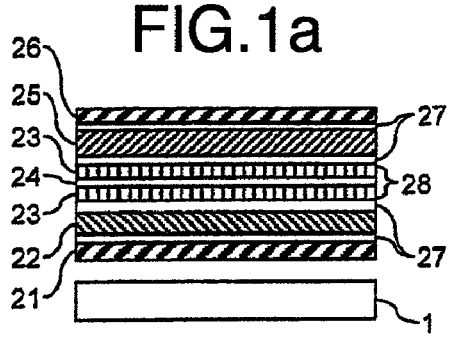
FIGS. 1a-1h are schematic views showing respective crystal liquid displays of the invention.

FIGS. 1a-1h are cross sectional views showing schematically respective crystal liquid displays of the invention. In FIG. 1a, a transparent resin layer 22 is arranged on a surface of a polarizing plate 21 opposed to another surface thereof facing to a light source 1, a liquid crystal cell 28 including a pair of glass substrates 23 and a liquid crystal layer 24 between the glass substrates 23 is arranged on the transparent resin layer 22, a transparent resin layer 25 is arranged on the liquid crystal cell 28, and a polarizing plate 26 is arranged on the transparent resin layer 25, and a transparent adhesive layer 27 fixes adjacent ones thereof to each other. Each of the transparent resin layers 22 and 25 is adhered to the 23 and respective one of the polarizing plates 21 and 26.

The transparent resin layer 25 prevented from being arranged between the light source 1 and the liquid crystal cell 28 has preferably a high ability of shock absorption for an impact applied from an outside and a high rigidity for restraining a force applied from the outside from being transmitted to the glass substrate. Further, the high rigidity thereof is preferable for restraining a panel from being curved or deformed.

Therefore, the transparent resin layer 25 is made of a visco-elastic material for restraining the impact from being applied to the liquid crystal panel so that the liquid crystal panel is prevented from being damaged by a stress when the great force is applied from the outside, or a hard plastic material for distributing the force widely to prevent a gap for the liquid crystal between the substrates from being changed when a local pressing force is applied, for example, to wipe a surface of the panel.

The transparent resin layer 25 is made of an elastomer having a thickness not less than 0.1 mm and not more than 5 mm, preferably not less than 0.2 mm and not more than 4 mm. The transparent resin layer 25 of such characteristic is used to improve mainly an impact resistance. The elastomer having a high shock absorption improves the impact resistance. When the thickness is less than 0.1 mm, the glass substrate 23 is destroyed in a steel ball drop test or the like, so the thickness needs to be not less than 0.1 mm. The transparent resin layer 25 having the thickness more than 5 mm causes an undesirable decrease in clearness of the displayed image. The thickness for obtaining the clearness of the displayed image without blur is not more than 4 mm.

The transparent resin layer 25 is made of the hard plastic material having a thickness not less than 0.1 mm and not more than 5 mm, preferably not less than 0.2 mm and not more than 4 mm. The transparent resin layer 25 made of the hard plastic having a rigidity higher than a rigidity of the elastomer improves the impact resistance and restrains the panel from being deformed by a high temperature generated by excitation of the light source or the like. When the thickness of the hard plastic is less than 0.1, the impact resistance measured by the steel ball drop test is not improved in comparison with a case where the transparent resin layer 25 of the hard plastic is not included. When thickness of the hard plastic is not less than 0.1 mm, the impact resistance is improved by about 1.5 times in comparison with the case. Therefore, the thickness is preferably not less than 0.1 mm. Further, for obtaining sufficiently both of the impact resistance and a panel deformation restraining effect, the thickness is preferably not less than 0.5 mm to improve the impact resistance by about twice in comparison with the case. Similarly to a case where the transparent resin layer 25 is made of the elastomer, when the thickness is more than 5 mm, the clearness of the displayed image is significantly decreased. The thickness for obtaining the clearness of the displayed image without blur is not more than 4 mm.

The polarizing plate 21 between the light source 1 and the liquid crystal cell 28 is heated by the light source 1, and the polarizing plate 26 prevented from being arranged between the light source 1 and the liquid crystal cell 28 is exposed to the atmosphere so that a temperature of the polarizing plate 21 is higher than that of the polarizing plate 26. Therefore, a thermal expansion of the polarizing plate 21 is greater than that of the polarizing plate 26 to cause a convex shape of the polarizing plate 21 protruding toward the light source 1 so that the panel is deformed. When an wavelength plate is arranged between the light source 1 and the liquid crystal cell 28, such deformation is further enhanced. A difference in linear thermal expansion coefficient between the polarizing plate 21 and the glass substrate 23 is great so that a local stress concentration on a boundary between the polarizing plate 21 and the glass substrate 23 is generated by the temperature increase to cause a removal or crack therebetween.

Therefore, the transparent resin layer 22 between the light source 1 and the liquid crystal cell 28 is preferably made of a material of low elastic modulus for decreasing the stress caused on the boundary by the difference in linear thermal expansion coefficient. The transparent resin layer 22 restrains the polarizing plate 21 from being deformed when the polarizing plate 21 is heated to the high temperature so that the liquid crystal panel is restrained from being deformed.

When the panel is kept at the high temperature for long time period, the polarizing plate 21 is deformed (expands or contracts). When a rubber hardness of the transparent resin layer 22 between the polarizing plate 21 and the glass plate 23 is more than A30, the polarizing plate is not restrained from being deformed, and the glass substrate 23 is also deformed so that the panel is curved or deformed. Further, there is a probability of a removal of polarizing plate 21 and the transparent resin layer 22 from the glass substrate 23. Therefore, the hardness of the transparent resin layer 22 between the light source 1 and the liquid crystal cell 28 is preferably not more than A30. A30 is a value of 30 in hardness measured by type A durometer under JISK6263.

The thickness of the transparent resin layer 22 is not less than 0.1 mm and not more than 5 mm, preferably, not less than 0.2 mm and not more than 5 mm.

When the thickness of the transparent resin layer 22 is less than 0.1 mm, the transparent resin layer 22 cannot decrease sufficiently the curvature of the polarizing plate heated to the high temperature. When thickness of the transparent resin layer 22 is more than 5 mm, a thermal energy generated by the light source for long time period is absorbed between the panel and the light source to increase the temperature in the liquid crystal display. Therefore, there is a provability of that a performance of a circuit substrate or the like decreases. Further, it is not preferable that a weight thereof increases in accordance with an increase in size of the panel, since the display is desired to decrease in thickness and weight. Further, for increasing a quality of the displayed image, the wavelength plate may be attached to the polarizing plate between the liquid crystal cell and the light source. In such case, the curvature of the polarizing plate heated to the high temperature is greater in comparison with that of the polarizing plate without the wavelength plate. Therefore, for sufficiently decreasing the curvature of the polarizing plate, the thickness of the transparent resin layer 22 needs to be significantly greater than 0.1 mm, preferably not less than 0.2 mm. In such case, the thicker the resin layer is, the smaller the curvature is, but since the temperature in the display increases significantly to cause a deterioration of a part thereof when the thickness is more than 5 mm, the thickness is not more than 5 mm.

Since the glass substrate 23 of the liquid crystal panel has the thickness not more than 1 mm, and the thickness of the panel is relatively small with respect to the size of the display, when the great impact is applied to the surface of the panel from the outside without destroying the glass substrate 23, the surface of the panel is deformed to have a concave shape protruding toward the light source. Under such condition, there is a provability of that the panel contacts the light source 1 or another member between the panel and the light source 1. There is a provability of that a surface of the panel facing to the light source is damaged by the impact without a damage of another surface of the panel facing to the viewer.

Figure 1B:
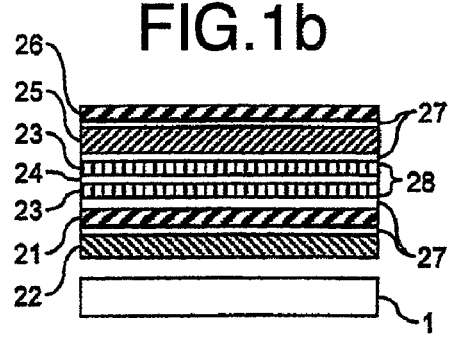

For preventing the surface of the panel facing to the light source and the another member between the panel and the light source 1 from being damaged, the transparent resin layer 22 may be arranged between the light source 1 and the polarizing plate 21 between the liquid crystal cell and the light source 1 as shown in FIG. 1b.

In FIGS. 1a and 1b, a linear thermal expansion coefficient of the transparent resin layer 22 between the liquid crystal cell and the light source is made smaller than that of the transparent resin layer 25 between the liquid crystal cell and the viewer. A difference in temperature is generated between the polarizing plate 26 arranged between the liquid crystal cell and the viewer to be influenced significantly by the atmosphere and the polarizing plate 21 between the liquid crystal cell and the light source. When the transparent resin layers of the same linear thermal expansion coefficient are arranged at respective sides of the glass substrates 23, a volume expansion at the side between the liquid crystal cell and the light source is greater than a volume expansion at the side between the liquid crystal cell and the viewer to cause the curvature of the panel. Therefore, the transparent resin layers of the same characteristic cannot decrease the difference in temperature between the polarizing plates causing the curvature or deformation of the panel. For improving the difference in temperature, the transparent resin layers at the respective sides facing to the viewer and the light source need to different from each other in characteristic. Concretely, for decreasing the difference in volume expansion, it is effective that the linear thermal expansion coefficient of the transparent resin layer between the liquid crystal cell and the light source to be heated significantly is made smaller than the linear thermal expansion coefficient of the transparent resin layer between the liquid crystal cell and the viewer.

The resin forming the transparent resin layers 22 and 25 are superior in transparency for visible wavelength range. For example, acrylate type resin, polycarbonate type resin, polyethylene-terephthalate type resin, acetyl-cellulose type resin, polyimide type resin, polyethylene-naphthalate type resin, epoxy type resin, cyclic-olefin type resin, cyclic-olefin-ethylene copolymer type resin, polyvinyl-butyral type resin, polyethersulfone type resin, polyvinyl-chloride, polystyrene or the like may be used. Further, a mixture of these resins, for example, polyethylene/polyphenylen-ether, polyvinyl-chloride/styrene-acrylonitrile copolymer, polyvinyl-chloride/polymethyl-methacrylate or the like may be used.

The transparent resin layers 22 and 25 may be a thick adhesive layer, a resin plate, an elastomer type transparent resin layer, or a transparent resin layer with an adhesive layer. The elastomer type layer may include a substrate on which the elastomer is arranged, substrates on each of which the elastomer is arranged, or substrates between which the elastomer is arranged.

Figure 1C:
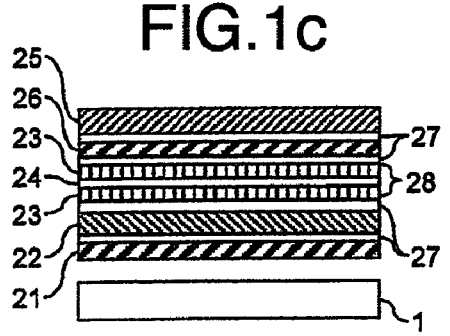

FIG. 1c shows the transparent resin layer 25 arranged between the viewer and the polarizing plate 26 arranged between the liquid crystal cell and the viewer. In this embodiment, the transparent resin layer 22 may be arranged between the light source and polarizing plate 21 arranged between the liquid crystal cell and the light source as shown in FIG. 1b.

Embodiment 2

Figure 1D:
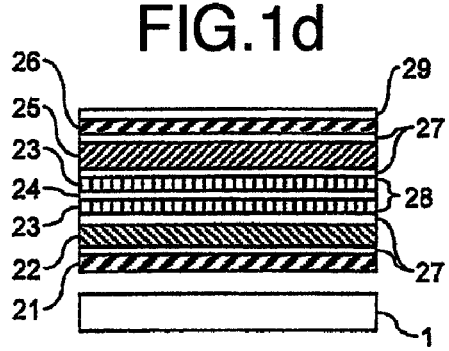
Figure 1E:
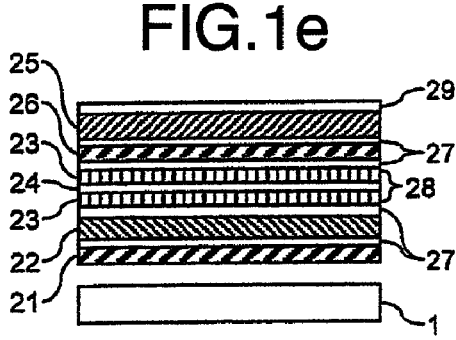
Figure 1F:
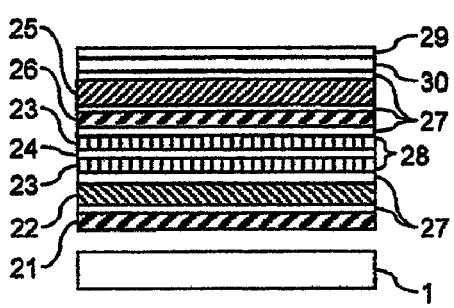

FIGS. 1d-1f are schematic cross sectional views of embodiments including respective surface treating surfaces 29 closest to the viewer in the panel. Further, in FIG. 1f, a protect film or plate 30 is arranged under the surface treating surface 29 to further increase a physical strength. The protect film or plate 30 may be made of acrylate type resin, polyethylene-terephthalate type resin or the like. It may be a glass plate.

The surface treating surface 29 may be an anti-reflecting layer, anti-glare layer, anti-fouling layer for preventing fouling from adhering to the surface, or the like. These layers may be stacked. The anti-reflecting layer may be single layer of, for example, $SiO_2$ or $MgF_2$ lower in refractive index than a layer to which the anti-reflecting layer is adhered. Alternatively, the anti-reflecting layer may be multilayer as a stack of high refractive index material, for example, $TiO_2$, $ZrO_2$ or the like and the low refractive index material, for example, $SiO_2$, $MgF_2$ or the like. The anti-glare layer includes a surface irregularity or fine grains to diffuse the reflected light, and is formed by coating a substrate with a solution including a binder and inorganic fine grains of silica or the like or organic fine grains of acrylate type resin or styrene type resin distributed in the binder, or etching the surface of the substrate to form the surface irregularity. The anti-reflecting layer, anti-glare layer or anti-fouling layer should not be limited to a particular shape. It may be formed directly on the surface closest to the view in the panel, or a film including such layer may be arranged on the surface closest to the view in the panel. A hard counting layer may be arranged so that such layer is formed on the hard counting layer. The anti-reflecting layer, anti-glare layer or anti-fouling layer may be formed by any method including the prior art. For example, a dry process such as a vacuum deposition method, sputtering method or the like, or a wet process such as a spin coating method, dip coating method or the like.

Embodiment 3

Figure 1G:
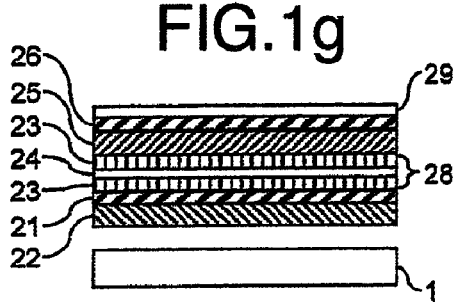
Figure 1H:
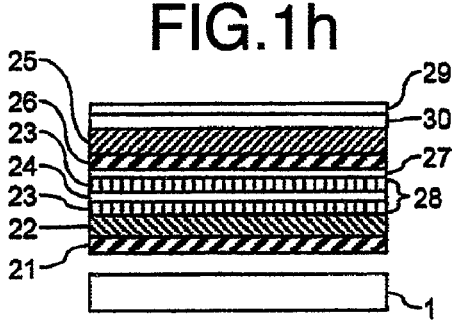

FIGS. 1g and 1h are schematic cross sectional views of embodiments including the transparent resin layers 22 and 25 of adhesive, and if adhesion thereof to the polarizing plate or the glass substrate is sufficient, all of the transparent adhesive layers 27 as adhesive for the transparent resin layers 22 and 25 may be eliminated as shown in FIG. 1g, or one of the transparent adhesive layers 27 as adhesive for the transparent resin layers 22 and 25 may be eliminated as shown in FIG. 1h. By eliminating the transparent adhesive layer 27, the thickness of the panel is decreased, and a producing process of the panel is simplified. In FIGS. 1g and 1h, the polarizing plate may be adhered to the transparent resin layer after the transparent resin layer is adhered to the glass plate. In these embodiments, the polarizing plate with the transparent resin layer or the polarizing plate with the wavelength plate may be used, and these layers may be stacked through the adhesive.

Hereafter, prototypes of the invention will be described. The scope of the invention is not restricted by the prototypes.

(Prototype 1)

Figure 2:
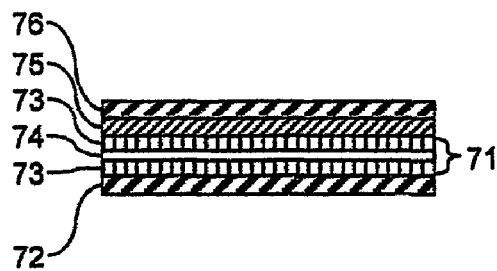
FIG. 2 is a schematic view showing a crystal liquid panel.

As shown in FIG. 2, a liquid crystal panel having size of 32 inches and including a transparent resin layer 75 as an acrylate type elastomer having thickness of 0.1 mm arranged between the viewer and the liquid crystal cell, was produced. The polarizing plate 72 arranged between the light source and the liquid crystal cell and the polarizing plate 76 arranged between the viewer and the liquid crystal cell have respective thicknesses of 0.2 mm, and each of the glass substrates 73 between which the liquid crystal layer 74 is arranged to form the liquid crystal cell 71 has a thickness of 0.7 mm. The elastomer has string adhesive strength to the glass plate and the polarizing plate so that the transparent resin layer is attached to the glass plate or the polarizing plate without the adhesive.

Figure 3:
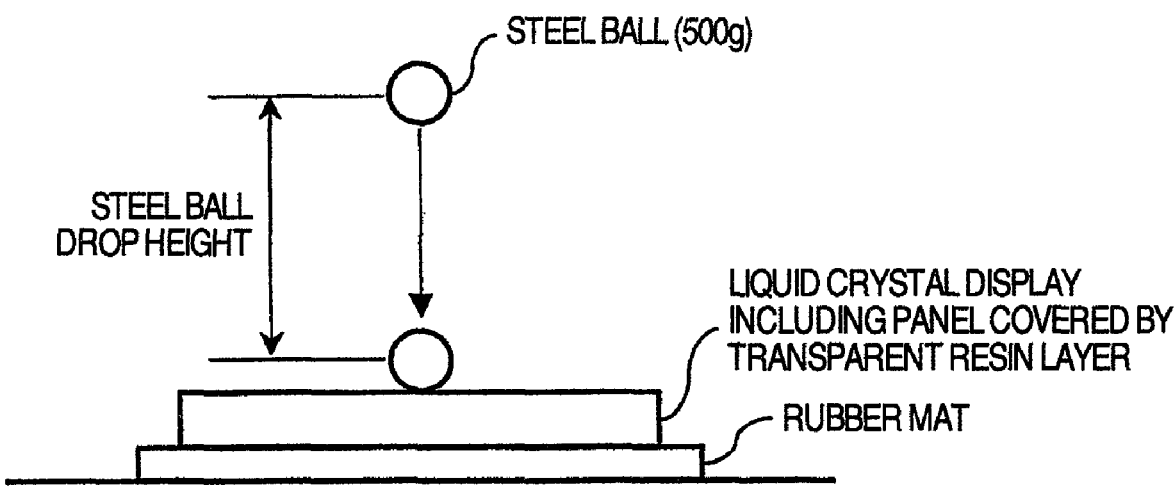
FIG. 3 is a schematic view showing an impact resistance test.

The impact resistance is evaluated by a steel ball drop test as shown in FIG. 3. In the steel ball drop test, the light source, the frame and so forth were attached to the panel to form the liquid crystal display. A rubber mat having thickness of 3 mm are mounted on a base, and the liquid crystal display was mounted on the mat. After allowing the steel ball having a weight of 500 g kept stationary to drop onto a central portion of the panel, the light source is excited to find a crack or breaking of the panel with visual inspection. A breaking height is a height through which the steel ball kept stationary drops onto the panel.

A visibility was obtained by measuring a degree of blur readable from a character formed on the display of the liquid crystal display including the panel, the light source, the frame and so forth. The degree of blur was measured to be ○ when the character was clearly visible, the degree of blur was measured to be Δ when the character was slightly blurred, and the degree of blur was measured to be X when the character was completely blurred.

A degree of the deformation of the panel obtained during the excitation of the light source as a curved value was obtained by measuring a difference in height between four corners of the panel laying horizontally during non-excitation of the light source and the four corners of the panel laying horizontally and heated for 120 minutes by the excitation of the light source. An average value of the heights of the four corners was deemed to be an average value of the curved value.

(Prototype 2)

The liquid crystal panel was produced similarly to the prototype 1 by using a polycarbonate film having a thickness of 0.5 mm as the transparent resin layer 75 arranged between the liquid crystal cell and the viewer. The polycarbonate film was adhered to each of the glass plate and the polarizing plate through a transparent adhesive film having a thickness of 0.025 mm.

(Comparative Sample 1)

The panel in which the transparent resin layer 75 was eliminated from the panel shown in FIG. 2 was produced.

(Comparative Sample 2)

The liquid crystal panel was produced similarly to the prototype 1 by using acrylate type elastomer having a thickness of 0.025 mm as the transparent resin layer 75 arranged between the liquid crystal cell and the viewer. Since the elastomer strongly adheres each of the glass plate and the polarizing plate, the acrylate type elastomer was adhered to each of the glass plate and the polarizing plate directly without another adhesive layer.

(Comparative Sample 3)

The liquid crystal panel was produced similarly to the prototype 1 by using acrylate type elastomer having a thickness of 0.05 mm as the transparent resin layer 75 arranged between the liquid crystal cell and the viewer. Since the elastomer strongly adheres each of the glass plate and the polarizing plate, the acrylate type elastomer was adhered to each of the glass plate and the polarizing plate directly without another adhesive layer.

The below table 1 shows a result of a steel ball drop test for measuring an impact resistance. The prototypes 1-3 in which the thickness of the transparent resin layer 75 is not less than 1 mm achieve not less than 1.5 times in breaking occurrence height in comparison with the comparative sample 1 without the transparent resin layer 75 similarly to the current TV. The transparent resin layer 75 having the thickness not less than 0.2 mm achieves not less than 2 times in breaking occurrence height.

TABLE 1

|  | Prototype 1 | Prototype 2 | Prototype 3 | Comparative sample 1 | Comparative sample 2 | Comparative sample 3 |
| --- | --- | --- | --- | --- | --- | --- |
| Thickness of transparent resin lawyer 75 (mm) | 0.1 | 0.2 | 0.5 | — | 0.025 | 0.05 |
| Breaking occurrence height (mm) | 180 | 240 | 420 | 120 | 120 | 140 |

(Prototype 4)

The liquid crystal panels were produced similarly to the prototype 1 by using respective polycarbonate plates having respective thicknesses of 3.5 mm, 4 mm, 4.5 mm, 5 mm, 5.5 mm and 6 mm as the transparent resin layer 75 arranged between the liquid crystal cell and the viewer. The polycarbonate plate was adhered to each of the glass substrate and the polarizing plate through the transparent adhesive film having the thickness of 0.025 mm.

The below table 2 shows a result of a visibility test applied to the prototypes 4 to measure an effect to an image quality in accordance with an increase in thickness of the transparent resin layer 75 arranged between the liquid crystal cell and the viewer. When the thickness of the transparent resin layer 75 was not more than 4 mm, the character formed on the display was clearly readable. When the thickness of the transparent resin layer 75 was 4.5 mm or 5 mm, the slight blur was found on the character of complex shape. When the thickness of the transparent resin layer 75 was more than 5 mm, the blur was found on the characters of any shapes to decrease the visibility.

TABLE 2

| | Thickness of transparent resin lawyer 75 (mm) | | | | | |
|---|---|---|---|---|---|---|
| | 3.5 | 4 | 4.5 | 5 | 5.5 | 6 |
| visibility | ○ | ○ | Δ | Δ | X | X |

(Prototype 5)

Figure 4:
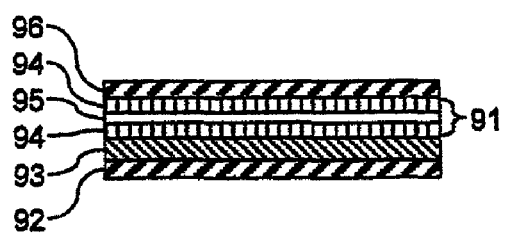
FIG. 4 is a schematic view showing a crystal liquid panel.

As shown in FIG. 4, the liquid crystal panel having the size of 32 inches was produced by using acrylate type elastomer having the thickness of 0.1 mm and the rubber hardness of A30 as the transparent resin layer 93 arranged between the liquid crystal cell and the light source. The elastomer was arranged only between the liquid crystal cell and the light source. The thickness of each of the polarizing plate 92 arranged between the liquid crystal cell and the light source and the polarizing plate 96 arranged between the liquid crystal cell and the viewer was 0.2 mm, and each of the glass substrates between which the liquid crystal layer 95 was arranged to form the liquid crystal cell 91 was 0.7 mm. Since the elastomer adheres strongly to each of the glass substrate and the polarizing plate, the transparent resin layer 93 was adhered to each of the glass substrate and the polarizing plate without another adhesive layer.

(Prototype 6)

The liquid crystal panel was produced similarly to the prototype 5 by using acrylate type elastomer having the thickness of 0.1 mm and the rubber hardness of A16 as the transparent resin layer 93 arranged between the liquid crystal cell and the light source. The polarizing plate 92 arranged between the liquid crystal cell and the light source included the wavelength plate to form the stack.

(Prototype 7)

The liquid crystal panel was produced similarly to the prototype 5 by using a transparent resin film having the thickness of 0.5 mm and the rubber hardness of A10 as the transparent resin layer 93 arranged between the liquid crystal cell and the light source. Since the elastomer used in this prototype was not adhesive, the elastomer was adhered to each of the glass plate and the polarizing plate through the transparent adhesive film having the thickness of 0.025 mm.

(Prototype 8)

The liquid crystal panel was produced similarly to the prototype 5 by using the transparent resin film having the thickness of 0.2 mm and the rubber hardness of A16 as the transparent resin layer 93 arranged between the liquid crystal cell and the light source.

(Comparative Sample 4)

The liquid crystal panel was produced similarly to the prototype 5 by using the transparent resin film having the thickness of 0.025 mm as the transparent resin layer 93 arranged between the liquid crystal cell and the light source.

(Comparative Sample 5)

The liquid crystal panel was produced similarly to the prototype 5 by using the polycarbonate film having the thickness of 0.5 mm as the transparent resin layer 93 arranged between the liquid crystal cell and the light source. The rubber hardness of the polycarbonate film is higher than A80.

The below table 3 shows a result of measuring the curvature of the panel when 120 minutes had elapsed with exciting the light source to consider the deformed degree of the panel heated for long time period. The average value of the curvature of the comparative sample 1 without the transparent resin layer was 0.6 mm. The average value of the curvature of the comparative sample 4 having the transparent resin layer 93 of the small thickness was the same as the comparative sample 1. The prototypes 5-8 with the elastomer having the rubber hardness not more than A30 and having the thickness not less than 0.1 mm were improved in curvature. The comparative sample 5 of polycarbonate film having the thickness of 0.5 mm and the hardness more than A30 was deteriorated in average value of curvature in comparison with the case without the transparent resin layer.

TABLE 3

| | Prototype 5 | Prototype 6 | Prototype 7 | Prototype 8 | Comparative sample 1 | Comparative sample 4 | Comparative sample 5 |
|---|---|---|---|---|---|---|---|
| Thickness of transparent resin layer 93 (mm) | 0.1 | 0.1 | 0.5 | 0.2 | — | 0.025 | 0.5 |
| Rubber hardness (durometer A) | A30 | A16 | A10 | A16 | — | A30 | >A80 |
| Average value of curvacure (mm) | 0.35 | 0.4 | 0.2 | 0.3 | 0.6 | 0.6 | 0.8 |

Incidentally, the liquid crystal display including the panel produced as the prototype 7 and the liquid crystal display including the panel produced as the comparative sample 1 were prepared. After 8 hours had elapsed while the two liquid crystal displays were set in a darkroom and the light source was excited, the image quality was measured visually. As a result thereof, unevenness in color was found in the vicinity of the frame of the liquid crystal display without the transparent resin layer. When the panel is curved largely, the panel and the frame contact each other with high pressure to decrease a gap in the liquid crystal cell so that a transmittance of the light generated by the light source is locally increased. Therefore, the unevenness in color is visibly generated. On the other hand, the unevenness in color was not found visually on the liquid crystal display with the transparent resin layer. From the above table 3, it is readable that since the curvature of the comparative sample 1 is greater than that of the prototype 7, the unevenness in color of the comparative sample 1 was generated.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display comprising a liquid crystal layer, a pair of substrates between which the liquid crystal layer is arranged, a pair of polarizing plates arranged between which the substrates are arranged, and a light source arranged at an outside of the polarizing plates,
wherein the liquid crystal display further comprises a first transparent resin layer being one of (A) arranged between the substrate arranged between the liquid crystal layer and the light source and the polarizing plate arranged between the liquid crystal layer and the light source and (B) arranged between the light source and the polarizing plate arranged between the liquid crystal layer and the light source, and a second transparent resin layer being one of (C) arranged between the substrate arranged between the liquid crystal layer and a viewer of the liquid crystal display and the polarizing plate arranged between the liquid crystal layer and the viewer and (D) arranged between the viewer and the polarizing plate arranged between the liquid crystal layer and the viewer, and
wherein the first and second transparent resin layers are different from each other in at least one characteristic of at least one of hardness, thickness and linear thermal expansion coefficient.

2. The liquid crystal display according to claim 1, wherein the first transparent resin layer is smaller than the second transparent resin layer in the linear thermal expansion coefficient.

3. The liquid crystal display according to claim 1, further comprises a transparent adhesive layer between at least one of the first and second transparent resin layers and the substrate, and another transparent adhesive layer between at least one of the first and the one of the second transparent resin layers and the polarizing plate.

4. The liquid crystal display according to claim 1, wherein at least one of the first and second transparent resin layers is adhesive.

5. The liquid crystal display according to claim 1, wherein the polarizing plate to be arranged between the liquid crystal layer and the viewer has a surface to face to the viewer, and the surface is formed by a treated layer.

6. The liquid crystal display according to claim 1, wherein a hardness of the first transparent resin layer is not more than 30 as measured by type A durometer.

7. The liquid crystal display according to claim 1, wherein a thickness of the first transparent resin layer is not less than 0.1 mm and not more than 5 mm.

8. The liquid crystal display according to claim 7, wherein a thickness of the first transparent resin layer is not less than 0.2 mm and not more than 5 mm.

9. The liquid crystal display according to claim 1, wherein the second transparent layer is made of elastomer and has a thickness not less than 0.1 mm and not more than 5 mm.

10. The liquid crystal display according to claim 9, wherein the second transparent layer has the thickness not less than 0.2 mm and not more than 4 mm.

11. The liquid crystal display according to claim 1, wherein the second transparent layer is made of a hard plastic and has a thickness not less than 0.1 mm and not more than 5 mm.

12. The liquid crystal display according to claim 11, wherein the second transparent layer has the thickness not less than 0.5 mm and not more than 4 mm.

* * * * *